United States Patent Office 3,215,394
Patented Nov. 2, 1965

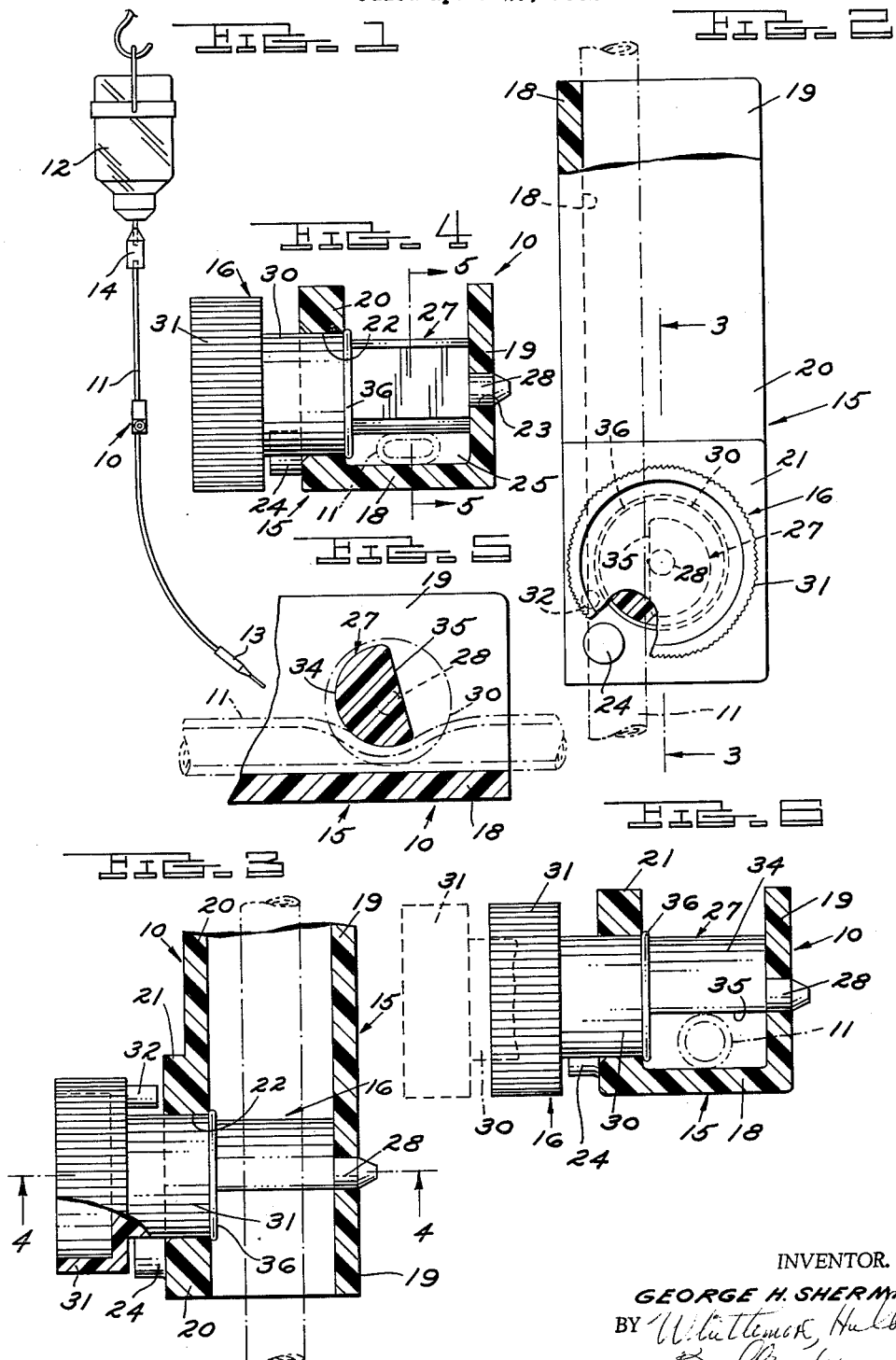

3,215,394
REGULABLE TUBE CLAMPING DEVICE FOR INTRAVENOUS INJECTION SET
George H. Sherman, Detroit, Mich., assignor to Sherman Laboratories, a partnership
Filed Apr. 23, 1962, Ser. No. 189,424
4 Claims. (Cl. 251—4)

The present invention relates to an improved clamping device for an intravenous injection set, such as is commonly employed in the administration of whole blood or plasma, dextrose solution and the like, which permits a ready manual regulation, using the fingers of one hand alone, to adjust or regulate the rate of supply of the liquid being administered. More particularly, the device of the invention is a "single use," or "throw-away" type which is extremely inexpensively manufactured, yet which affords an always reliable adjustable clamping action on the plastic tube of the injection or administration set; which permits of being applied to such tube while the latter is assembled to the drip chamber and needle, without requiring a threading of the tube through the device; and which, as thus mounted to the tube, enables the latter to be given the maximum compression for a minimum rate of liquid feed therethrough in less than a single full turn of an eccentric type valving element of the device.

Existing types of regulating devices of a character generally comparable to that of the invention have exhibited certain substantial drawbacks which it is a purpose of the present improvement to eliminate. That is, in some flow regulating devices presently on the market, a hand screw threaded to a mount is employed to compress the plastic tube of the set, with the tube endwise threaded into the mount beneath the screw. If fabricated inexpensively of plastic, as is desirable, the threads of the screw tend to strip, with the result that the latter is apt to go off center, relative to the tube, hence not to shut off or regulate the flow through the tube uniformly under a desired number of turns of the screw.

As indicated, existing devices which require threading of the flow tube therethrough increase the time necessary to place the administration set in condition for use, which must be followed by sterilizing the parts. On the other hand, if the mounting body of the device is slotted to permit a sidewise insertion of the tube without threading the latter into place between the body and adjusting member, it has been found that the body, if fabricated of an even slightly flexible plastic material, tends to "give" due to the slot, with resultant unreliability as to the regulating function.

In all devices relying upon the use of a threaded flow cut-off or regulating element, it is necessary in manufacture to test the screw and the tube mounting body receiving the screw for performance in threading action, thus adding another production cost factor.

Another type of device operates under a cylinder or roller and ramp principle, in which a serrated cylinder is progressively rolled into place over a tube while being approached toward the axis of the latter to provide a regulating or squeeze-off action. However, if molded of any reasonably flexible material, the cylinder's trunnion way tends to give and fails to exert desired uniform pressure on the tube; and it has been found that sometimes not enough friction is present between the trunnions and ramp to hold the serrated roller in its adjusted position.

Still another type of device comprises a slotted metallic member, which has a tendency to saw through the plastic liquid feed tube, and is, moreover, rather difficult to operate using one hand only.

It is therefore a general object of the invention to provide an improved regulable tube clamping device for an intravenous administration or injection set which can be readily and quickly applied to the tube, with the latter already in assembly with other components of the set.

Another object is to provide a device as described which eliminates screw means as a component thereof, hence obviates operational difficulties arising because of such means, and the need for testing for trueness.

A still further object is to provide a device which, as inexpensively fabricated of a suitable non-metallic, preferably molded plastic material, permits an unvaryingly and reliably true regulation of the application of adjusting or shut-off pressure to the supply tube of the set, with the device supported in the fingers or palm of one hand and its rotary valving element manipulated between the thumb and forefinger.

More specifically, the invention affords a device comprised of but two very inexpensively produced molded plastic parts, i.e., a channel-shaped body or mounting member and an adjustable valve or shut-off member. The shut-off member has an eccentric formation acting, upon rotation of the last named member, to adjust the cross sectional area of the tube interior variably, as determined by the degree of rotation of the eccentric component. This may involve but a partial cut off of the flow capacity of the tube in its uncompressed condition, up to a complete squeezing of the latter to full shut-off position.

In accordance with this specific object, the eccentric member has a removable mount on the channel body, enabling its withdrawal from the side flanges of said body in a direction at 90° to such flanges and along the axis of rotation of the eccentric member, thus enabling the tube to be slipped in place laterally, i.e., in a direction at 90° of its axis, with the eccentric member removed in the fashion described, whereupon said member is replaced and the device is ready for operation.

Still more specifically, the invention contemplates a two-part device, as described, in which the eccentric member, as mounted in an open channel of the body member by coaxial barrel and stem or trunnion portions of relatively larger and smaller diameter, respectively, is provided with a knurled cylinder fingerpiece externally of one of the flanges or walls of the body for convenient manipulation in the palm of the user.

Still another specific object is to provide a device having an eccentric member mounted as described, in which the barrel trunnion portion is formed to provide a snap bead engaging laterally the inner surface of the trunnion flange to hold the member in place, and in which the last named flange and knurled finger element are provided with coacting stops adapted to indicate to the user the condition of the device in respect to its full tube opening and full tube closing positions, the eccentric being shifted between these extremes in less than one complete turn on its axis.

The foregoing as well as other objects will become more apparent as this description proceeds, especially when considered in connection with the accompanying drawing illustrating the invention, wherein:

FIG. 1 is a fragmentary elevational view generally illustrating the type of intravenous administration or injection set with which the improved regulating device is attached for use;

FIG. 2 is a side elevational view, partially broken away and in longitudinal central section, illustrating the device, per se;

FIG. 3 is a fragmentary view, partially broken away and in transverse vertical or longitudinal section along line 3—3 of FIG. 2, the integral eccentric barrel and fingerpiece element of the device being partially rotated from its position indicated in FIG. 2;

FIG. 4 is a view in transverse horizontal section on line 4—4 of FIG. 4 showing the device in one position of adjustment thereof to partially or wholly restrict liquid flow through a supply or feed tube under compression;

FIG. 5 is a fragmentary view in vertical transverse section on line 5—5 of FIG. 4; and FIG. 6 is a view similar to FIG. 4, showing the device in another position for straight-through, unrestricted flow in the tube.

The improved device of the invention is generally designated by the reference numeral 10; and is illustrated in FIG. 1 in its operatively positioned mount on an elongated flexible and transparent plastic tube 11 of a conventional administration set for whole blood, plasma, dextrose solution and the like, the set further comprising an up-ended and suspended liquid container or bottle 12 for the agency to be injected and a conventional hypodermic needle 13, usually fed through drip sack 14. By reason of the improvements of the invention, the device is capable of being operatively positioned on the tube or hose 11 without threading the latter therethrough, so that all the other described components may be preassembled and sterilized, without requiring a sterilizing following a tube thread-through operation. Device 10 essentially comprises a body member 15 and a combined fingerpiece and valving member 16.

The body 15 is preferably molded of a suitable plastic material, such as polyethylene or equivalent compound, in a relatively elongated outline of channel-shaped cross-section in a plane transverse of its length. This provides on the body 15 a flat base portion 18 coextensive in length with the body and of a width somewhat greater than the diameter of a tube 11 to be regulated, and a pair of integral upright walls or flanges 19, 20 parallelling one another and projecting in the same direction from base portion 18, being also coextensive in length with the body 15 as a whole. Member 16 is also molded of a suitable plastic material.

Inasmuch as the wall or flange 20 is intended to serve as a basic journal or bearing member for the eccentric valving member 16, it is molded in a substantially greater thickness at a boss 21 than the other flange 19.

Furthermore, flange 20 is provided with an enlarged cylindrical journal opening 22 through the boss 21, and the flange 19 is provided with a coaxial journal opening 23 of smaller diameter. On the outer side thereof, the flange 20 is molded with an integral stop lug 24 on boss 21, for a purpose to be described; and internally thereof the flanges 19 and 20 of body 15 afford a channel or elongated recess 25 which longitudinally receives a portion of the length of tube 11.

The fingerpiece and eccentric valving member 16 is also of one-piece construction, essentially comprising an eccentric formation or portion 27 disposed between the inner surfaces of flanges 19, 20; a small diameter stem or pilot extension 28 which is received as a trunnion in the aperture 23 of flange 19, having a fairly close tolerance fit therein; a substantially larger diameter cylindrical journalling or barrel portion 30; and a knurled cylindrical fingerpiece 31 which, as illustrated in FIGS. 2 and 3, is provided with an integral stop pin or lug 32. This lug is engageable with the external lug 24 of body 15 at either opposite extreme of the manipulating rotation of the valving member 16 throughout an arc of somewhat less than 360°.

As best illustrated in FIG. 5, the actual eccentric valving portion 27 of member 16 is of quasi-cylindrical cross section, comprising an arcuate surface 34 of somewhat greater than 180° extent and a chord surface 35 subtending the arc, leaving portion 27 of an approximately D-shaped outline. It is thus seen that, as journalled by its barrel portion 30 and its pilot bearing or stem portion 28 in the flanges 20, 19, respectively, of the body 15, the member 16 and its eccentric valving portion 27 are capable of rotation from a first tube release position (FIGS. 2 and 6) through somewhat less than 360° to a terminal full or approximate shut-off position (FIGS. 3, 4 and 5) in the first named of which positions the pin or lug 32 of member 16 is adapted for abutment with one side of the stop 24 of base 15, and in the last named position to be adapted to abut the opposite side of lug 24.

Thus, the user is, without inspection, apprised of the condition of the device 10 as regards its full-through or cut-off positions, and with some degree of practice may readily manipulate the device between these positions and other intermediate positions to obtain an adjustment of the flow rate in tube which is desired.

The barrel portion 30 of valving member 16 has a reasonably close tolerance bearing engagement in the flange opening 22, enabling it to be withdrawn and placed endwise, as suggested, in dotted line in FIG. 6 of the drawing. For the purpose of holding the member 15 in place in its operative position, shown in solid line in FIG. 6, the barrel portion 30 may be molded to provide an annular bead 36 of very small size between it and the eccentric valving portion 27. Since the material of which the member 16 and body 15 are molded is a plastic having some degree of elasticity, the barrel 16 may be inserted into and removed from the hole 22 notwithstanding this slight degree of oversize at bead 36; and the latter will snap in place adjacent the inner wall of flange 20 to releasably hold members 15 and 16 in assembly.

The device is extremely compact, inexpensively molded and assembled and rapidly applied to the tube 11, yet it enables the tube 11 to be compressed as desired depending upon the variable rotation of barrel portion 27. In any adjusted position of rotation, there is sufficient friction at the journal openings 22, 23, as supplemented by the friction of engagement of portion 27 with tube 11, to enable the parts to maintain their relative adjusted position.

What I claim as my invention is:

1. An adjustable type of tube flow regulating device, comprising one-piece body and valving members fabricated of plastic material, said body member having a portion against which a tube may be clamped to regulate the flow of liquid through the tube, and upright, laterally spaced wall portions projecting from said first named portion and each having a bearing recess therein, said valving member being rotatably mounted with bearing portions journalled in said bearing recesses, an eccentric portion between said projecting wall portions which is of no greater radial dimension than one of said bearing portions, and a portion on the outer side of one of said wall portions for manually operating said eccentric portion rotatively to compress a tube between said eccentric portion and said first named portion of said body member, thus to variably regulate flow through the tube, said one bearing portion and said eccentric portion of said valving member being proportioned in size and shape relative to said bearing recesses to enable said valving member to be removably mountable as a unit upon said upright wall portions of the body member in the direction of the axis of rotation of said valving member with the tube placed in engagement transversely of its length on said first named body member portion, said wall portions being spaced from one another throughout the entire length and at their tops to provide a channel open at an upper side and opposite ends permitting said placement.

2. A regulating device for a tube, comprising a somewhat elongated mounting body of channel-shaped cross section having a base portion and upright flanges projecting from said portion and spaced from one another along their entire length and at their tops to define said section, said flanges having aligned cylindrical bearing recesses of different size, and a valving member having a cylindrical trunnion portion of relatively large diameter extending through the larger bearing recess of one of said flanges and rotatably mounting the same in said flange, a bearing portion of smaller diameter than said trunnion portion providing a journal for said valving member in the smaller recess of the other flange, an eccentric portion between said respective trunnion and bearing portions and said flanges which is of no greater radial dimension than said large diameter trunnion portion and is adapted to act compressively on a tube disposed between the eccentric portion and said base portion of said body, a snap bead portion of larger diameter than said larger bearing recess between said one flange and said eccentric portion, and a fingerpiece external of said one flange and coaxial with said trunnion portion, said trunnion and eccentric portions of said valving member being proportioned in size and shape relative to said bearing recesses whereby said valving member is insertable and withdrawable as a unit from said flanges in the direction of the axis of said trunnion and bearing portions with the tube in engagement transversely of its length with said base portion of said body.

3. A regulating device for a tube, comprising a somewhat elongated mounting body of channel-shaped cross section having a base portion and upright flanges projecting from said portion and spaced from one another along their entire length and at their tops to define said section, said flanges having aligned cylindrical bearing recesses of different size, and a valving member having a cylindrical trunnion portion of relatively large diameter extending through the larger bearing recess of one of said flanges and rotatably mounting the same in said flange, a bearing portion of smaller diameter than said trunnion portion providing a journal for said valving member in the smaller recess of the other flange, an eccentric portion between said respective trunnion and bearing portions and said flanges which is of no greater radial dimension than said large diameter trunnion portion and is adapted to act compressively on a tube disposed between the eccentric portion and said base portion of said body, a snap bead portion of larger diameter than said larger bearing recess between said one flange and said eccentric portion, and a fingerpiece external of said one flange and coaxial with said trunnion portion, said trunnion and eccentric portions of said valving member being proportioned in size and shape relative to said bearing recesses whereby said valving member is insertable and withdrawable as a unit from said flanges in the direction of the axis of said trunnion and bearing portions with the tube in engagement transversely of its length with said base portion of said body, said bearing portion projecting through said smaller bearing recess and externally of said other flange to serve as an element for the application of pressure for the withdrawal of the valving member.

4. An adjustable type of tube flow regulating device, comprising body and valving members, said body member having a portion against which a tube may be clamped to regulate the flow of liquid through the tube, and upright, laterally spaced wall portions projecting from said first named portion and each having a bearing recess therein, said valving member being rotatably mounted with bearing portions journalled in said bearing recesses, an eccentric portion between said projecting wall portions which is of no greater radial dimension than one of said bearing portions, and a portion on the outer side of one of said wall portions for manually operating said eccentric portion rotatively to compress a tube between said eccentric portion and said first named portion of said body member, thus to variably regulate flow through the tube, said one bearing portion and said eccentric portion of said valving member being proportioned in size and shape relative to said bearing recesses to enable said valving member to be removably mountable as a unit upon said upright wall portions of the body member in the direction of the axis of rotation of said valving member with the tube placed in engagement transversely of its length on said first named body portion, said wall portions being spaced from one another and at their tops to provide a channel open at an upper side and permitting said placement.

References Cited by the Examiner
UNITED STATES PATENTS

| | | | |
|---|---|---|---|
| 2,649,635 | 8/53 | Peterson | 24—134 |
| 2,889,848 | 6/59 | Redmer | 137—315 |
| 2,941,778 | 6/60 | Bujan | 251—9 |
| 3,012,752 | 12/61 | Buck | 251—309 |
| 3,016,915 | 1/62 | Moeller | 251—9 XR |

FOREIGN PATENTS 202,470    1923    Great Britain.

ISADOR WEIL, *Primary Examiner.*